United States Patent [19]
Zheng et al.

[11] Patent Number: 5,797,971
[45] Date of Patent: Aug. 25, 1998

[54] METHOD OF MAKING COMPOSITE ELECTRODE MATERIALS FOR HIGH ENERGY AND HIGH POWER DENSITY ENERGY STORAGE DEVICES

[75] Inventors: Jian-Ping Zheng, Eatontown; T. Richard Jow, Chatham, both of N.J.

[73] Assignee: The United States of America as represented by the Secretary of the Army, Washington, D.C.

[21] Appl. No.: 718,883

[22] Filed: Sep. 24, 1996

Related U.S. Application Data

[62] Division of Ser. No. 353,403, Dec. 9, 1994, Pat. No. 5,621,609.

[51] Int. Cl.⁶ .................................................. H01G 9/15
[52] U.S. Cl. ........................................................ 29/25.03
[58] Field of Search .................... 29/25.03; 361/503, 361/504, 505, 516, 518, 562

[56] References Cited

U.S. PATENT DOCUMENTS

| | | | |
|---|---|---|---|
| 3,536,963 | 10/1970 | Boos | 317/230 |
| 4,448,856 | 5/1984 | Zuckerbrod et al. | 429/27 |
| 4,880,937 | 11/1989 | Matsushita et al. | 546/344 |
| 5,079,764 | 1/1992 | Malaspina | 361/502 |
| 5,080,963 | 1/1992 | Tatarchuk et al. | 428/225 |
| 5,086,373 | 2/1992 | Kurabayashi et al. | 361/502 |
| 5,096,663 | 3/1992 | Tatarchuck et al. | 419/11 |
| 5,102,745 | 4/1992 | Tatarchuck et al. | 428/605 |
| 5,121,301 | 6/1992 | Kurabayashi | 361/502 |
| 5,136,474 | 8/1992 | Sarangapani et al. | |
| 5,395,705 | 3/1995 | Door et al. | 429/42 |
| 5,523,177 | 6/1996 | Kosek et al. | 429/40 |

FOREIGN PATENT DOCUMENTS

| | | |
|---|---|---|
| 53-068858 | 6/1978 | Japan . |
| 55-165621 | 12/1980 | Japan . |
| 2-007509 | 1/1990 | Japan . |
| 1083247 | 3/1984 | U.S.S.R. . |

*Primary Examiner*—John Niebling
*Assistant Examiner*—Thomas G. Bilodeau
*Attorney, Agent, or Firm*—Michael Zelenka; John M. O'Meara

[57] ABSTRACT

This invention relates to a composite electrode material for use in high energy and high power density electrochemical capacitors, and to the electrochemical capacitor containing the electrodes. The electrodes are comprised of materials with high specific capacitance and electronic conductivity/high porosity. Specifically, the electrode is comprised of $RuO_2 \cdot xH_2O$ powder and carbon black or carbon fiber.

5 Claims, 2 Drawing Sheets

METHOD OF MAKING COMPOSITE ELECTRODE MATERIALS FOR HIGH ENERGY AND HIGH POWER DENSITY ENERGY STORAGE DEVICES

This is a division of application of Ser. No. 08/353,403, filed Dec. 9, 1994, now U.S. Pat. No. 5,621,609.

GOVERNMENT INTEREST

The invention described herein may be made, used, sold or licensed by, or on behalf of, the Government of the United States of America without the payment to us of any royalties thereon.

RELATED APPLICATION

The present application is related to U.S. patent application Ser. No. 08/232,901, filed Apr. 21, 1994, entitled, "Electrode Materials from Hydrous and/or Hydrous Mixed Metal Oxides and Method of Preparing the Same," Attorney Docket No. CECOM-5018.

BACKGROUND OF THE INVENTION

1. Field of the Invention

This invention relates to high power electrochemical capacitors comprised of high energy density electrode materials. In particular, this invention relates to electrode structures comprised of composite electrode materials and an electrolyte.

2. Prior Art

Electrochemical capacitors are devices which store electrical energy at the interface between an ionically-conducting electrolyte phase and an electronically-conducting electrode material. Electrochemical capacitors were first described in a 1957 patent by Becker, listed infra. The first practical devices were pioneered by SOHIO and described in U.S. Pat. No. 3,536,963. These devices were based on the double-layer capacitance developed at the interface between high-area carbon electrodes and sulfuric acid electrolyte solution. A complementary system originating from a different electrochemical phenomenon, i.e. the development of pseudocapacitance associated with a surface reaction, was developed by Conway in 1975, in collaboration with Continental Group, Inc. See Can. Pat. by Craig, which is also listed Infra. The materials possessing pseudocapacitance discovered in Conway et al.'s work are metal oxides which include ruthenium oxide, iridium oxide, cobalt oxide, molybdenum oxide, and tungsten oxide. The most effective material discovered was ruthenium oxide which gives a reversibly accessible pseudocapacitance of many Farads per gram over a 1.4 volt range.

Composite electrode structures have previously been used in electrochemical capacitors and batteries. For example, Tatarchuk et al in U.S. Pat. Nos. 5,080,963, 5,096,663 and 5,102,745 describe an electrode comprised of highly conductive metal fibers and highly porous carbon fibers. The carbon fiber is used as the active material which contributes the capacitance for charge storage and which has a low electrical conductivity. The metal fiber is highly electrically conductive and was used to form a network for reducing the resistance of the electrode. In U.S. Pat. Nos. 5,065,286, 5,086,373 and 5,121,301, Kurabayashi et al describe a polarized electrode structure which is similar to the composite electrode structure mentioned above. The polarized electrode structure comprises an active material and a honeycomb type current collector. The honeycomb type current collector is used to increase the contacting area between the active material and the current collector and, therefore, the resistance of the electrode is reduced.

Malaspina, in U.S. Pat. No. 5,079,675, describes another type composite electrode for electrochemical capacitors. This electrode is formed by coating metal oxides onto particles of a high surface area material such as carbon black. The purpose of coating the metal oxides onto the carbon is to facilitate fabrication of the electrodes.

For many batteries' electrodes, carbon black is mixed with active materials, such as $MnO_2$, $CoO_2$, $SO_2$, $Li_xCo_{1-x}O_2$, $Li_xMn_{1-x}O_2$, and $Li_xV_{1-x}O_2$. A description of such battery electrodes is found in a reference by Linden listed infra. The carbon black serves the dual purpose of increasing the electrical conductivity and the porosity of the electrode. Because carbon is more electrically conductive and is more porous than those active materials which are semiconductors, ions in the electrolyte react quickly. Therefore, both effects enhance the battery's performance at high rates.

The following is a list of relevant prior art:

U.S. PATENT DOCUMENTS

| | | |
|---|---|---|
| 3,536,963 | /1957 | Becker |
| 5,065,286 | 12/1991 | Kurabayashi et al. |
| 5,072,336 | 12/1991 | Kurabayashi et al. |
| 5,079,674 | 01/1992 | Malaspina |
| 5,080,963 | 01/1992 | Tatarchuk et al. |
| 5,086,373 | 02/1992 | Kurabayashi et al. |
| 5,096,663 | 03/1992 | Tatarchuk |
| 5,102,745 | 04/1992 | Tatarchuk et al. |

FOREIGN PATENT DOCUMENTS

| | | |
|---|---|---|
| 1,196,683 | 06/1990 | Canada |

OTHER PUBLICATIONS

D. Linden, "Handbook of Batteries and Fuel Cells", McGraw-Hill Book Co., New York, 1984.

SUMMARY OF THE INVENTION

The objective of this invention is to provide a composite electrode structure that can achieve high power density and high energy density for use in electrochemical capacitors.

Possible applications of such composite electrodes include: electrochemical capacitors, batteries, and gas evolution anodes for chlorine, oxygen, or hydrogen.

The composite electrode according to the present invention is made by mixing together $RuO_2.xH_2O$ powder and high porosity carbon black saturated with an electrolyte. The power density of a capacitor made according to the present invention is greater than twice that of a capacitor made with electrode containing only an active material, such as hydrous ruthenium oxide ($RuO_2.xH_2O$), that is, a capacitor made with this electrode provides a power density greater than 10 kW/kg and an efficiency greater than 90%. In contrast, a capacitor made with electrodes containing only $RuO_2.xH_2O$ powder will provide a power density less than 100 W/kg. Moreover, the energy density at high charge/discharge rates is improved for capacitors made according to the present invention. Such a capacitor would include:

(1) an anode (a negative electrode) comprised of $RuO_2.xH_2O$ power and carbon black saturated with electrolyte;

(2) an electrolyte comprised of sulfuric acid of various concentration or other electrolytes; and (3) a cathode (a positive electrode) comprised of $RuO_2.xH_2O$ powder and carbon black saturated with electrolyte.

Such capacitors with composite electrodes comprised of $RuO_2.xH_2O$ powder and carbon black exhibit an enhanced, linear voltage-charge relationship, excellent reversibility, low resistance, and long cycle life. This composite electrode and composite electrodes of this type made with different metal oxides may also be used as electrode materials for batteries, as a catalyst for fuel cells and as gas evolution electrodes for chlorine, oxygen or hydrogen.

BRIEF DESCRIPTION OF THE DRAWINGS

These and other benefits of the present invention will be better understood in light of the Detailed Description of the Invention and the attached drawings wherein.

DETAILED DESCRIPTION OF THE PREFERRED EMBODIMENTS

Figure 1:
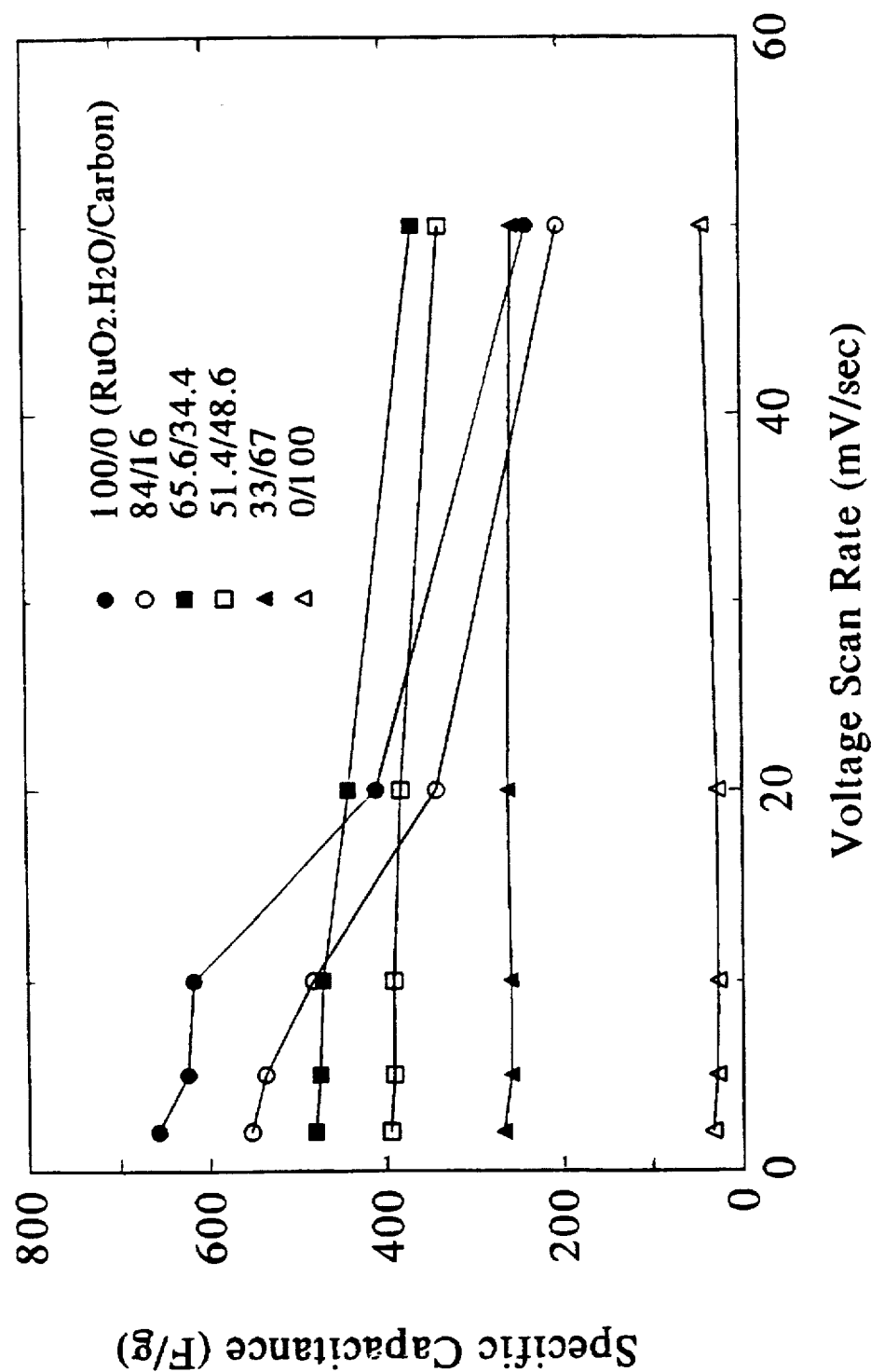
FIG. 1 is a graph of the specific capacitance as a function of the voltage scan rate for composite electrodes made from different weight ratios between carbon black and $RuO_2.xH_2O$ powder, wherein the specific capacitance is calculated from the cyclic voltammetric curves. For this graph, the carbon black used was Vulcan XC-72 and the $RuO_2.xH_2O$ powder was made by annealing the commercial $RuO_2.nH_2O$ powder (13 weight % $H_2O$) powder at a temperature of 115° C. in air.

The electrochemical capacitor of this invention includes electrodes comprised of a composite of $RuO_2.xH_2O$ powder, carbon black, and an electrolyte. Examples of the types of carbonaceous material which may be used in accordance with the present invention are Black Pearls 2000 (Cabot Corp.) or Vulcan XC-72 (Cabot Corp.) and an example electrolyte would include a 5.3 molar sulfuric acid ($H_2SO_4$). The $RuO_2.xH_2O$ in the electrodes of the electrochemical capacitor of this invention can be prepared by two different methods. The preferred method is described in the Related Application, U.S. patent application Ser. No. 8/232,901, which is incorporated herein by reference.

Briefly though, the $RuO_2.xH_2O$ powder is prepared using a sol-gel process, wherein a precipitate is obtained by mixing aqueous solutions of NaOH and $RuCl_3.xH_2O$. The NaOH is used primarily to adjust the pH to a value of approximately 7, that is, the point at which a controlled precipitation can occur. The precipitate obtained is $RuO_2.2H_2O$, which is then heated to a temperature of about 100°–150° C. to form the electrodes. In an alternate embodiment, $RuO_2.xH_2O$ powder is formed by heating commercially available $RuO_2.nH_2O$ (13 weight % $H_2O$) powder (Johnson Matthey) to a temperature of about 100° C.

The specific capacitance of $RuO_2.xH_2O$ formed at different temperatures has been measured using cyclic voltammetric technique. The specific capacitance is strongly dependent on the annealing temperature. In general, at annealing temperatures lower than the point at which crystalline anhydrous $RuO_2$ forms, the specific capacitance is higher and increases with an increase in the annealing temperature. But when the crystalline $RuO_2$ appears, the specific capacitance drops rapidly. For $RuO_2.xH_2O$ powder made by sol-gel process, the specific capacitance of the precipitate of $RuO_2.2H_2O$ powder is about 540 F/g. However, after annealing at a temperature of 150° C., the specific capacitance increases to over 720 F/g. At temperatures higher than 175° C., though, crystalline $RuO_2$ starts to form and the specific capacitance drops to a value of less than 430 F/g. For commercial $RuO_2.nH_2O$ (13 weight % $H_2O$) powder, the specific capacitance is approximately 300 F/g which makes anode and cathode behaviors non-symmetric. However, when the powder is annealed at 115° C., the specific capacitance rises to a value of 666 F/g and symmetric anode and cathode behaviors are obtained. When the annealing temperature is greater than 120° C., the crystalline phase is formed and the specific capacitance starts to drop. The annealing temperature for the optimum specific capacitance varies with the conditions of the starting materials.

As stated previously, either Black Pearls-2000 or Vulcan XC-72 can be mixed with $RuO_2.xH_2O$ powders for the fabrication of composite electrodes. However, other carbonaceous materials may be used in this invention so long as they are highly porous and electrically conductive. The purpose of using the highly porous carbon materials is to absorb more electrolyte. The carbonaeous materials should be electronically conductive in order to provide a low resistance for electrochemical capacitors made with composite electrodes.

TABLE I

Physical Properties of $RuO_2.xH_2O$ and Carbon Blacks

| Materials | Specific Surface Area ($m^2/g$) | Specific Capacitance (F/g) | Resistivity (Ω-cm) | w*/w_c |
|---|---|---|---|---|
| $RuO_2.xH_2O$ | 30–70 | 666–720 | $3 \times 10^{-3}$ | <0.50 |
| Black Pearls-2000 | 1360 | 216 | 0.226 | 3.78 |
| Vulcan XC-72 | 210 | 30 | 0.287 | 1.76 |

The specific surface area was measured by a surface analyzer and the specific capacitance in $H_2SO_4$ electrolyte was calculated from the measurement of cyclic voltammogram. The resistivity was measured from pellets made by pressing $RuO_2.xH_2O$ or carbon blacks at a pressure of 8000 lb/cm². $W_c$ and W* were the weight of dry powder and the weight of powder after absorbing 5.3 moles of $H_2SO_4$ electrolyte, respectively.

The energy storage mechanism for the electrochemical capacitors is believed to occur either through the separation of charges at the interface between a solid electrode and an electrolyte, or fast faradaic reactions occurring between a solid electrode and an electrolyte. These energy storage mechanisms are somewhat similar to that of batteries. However, one of the most important advantages of electrochemical capacitors when compared to batteries is that the energy can be stored or retracted at a much higher rate. In order to achieve a fast charge/discharge rate, the following two conditions must be satisfied for electrodes used in electrochemical capacitors:

(1) The charge separation or faradaic reaction should occur rapidly in electrochemical capacitors. Ion migration in electrolytes of electrochemical capacitors is relatively slow. The time taken by the ion to travel from the electrolyte absorbed by the separator to the surface of the solid electrode can be quite long (e.g. >>10 seconds), since electrodes are highly porous and the effective path for ion travel is much longer than the thickness of the electrode. In order to decrease the time for charge separation or faradaic reactions, sufficient amounts of ions should be near the surface of powders in the electrode. To achieve this goal, adequate amount of electrolyte can be absorbed by a material with high porosity, such as carbon. The minimum amount of electrolyte needed by electrode materials can be calculated based on the specific capacitance of the electrode and the ion content of the electrolyte.

(2) The electrode for use in electrochemical capacitors should be highly conductive so that the voltage drop can be ignored during high current charge or discharge to the load, and most of the energy stored in electrochemical capacitors can be delivered into the load. Therefore, materials to be used in electrodes should be highly electrically conductive. Since powder or fiber materials are mostly used in electrodes of electrochemical capacitors, powder to powder or fiber to fiber interfaces should be tightly connected together to minimize the contact resistance in electrodes.

$RuO_2.xH_2O$ powder is used as a basic active material for electrodes according to the preferred embodiment of this invention. $RuO_2.xH_2O$ has a very high specific capacitance. $RuO_2.xH_2O$ powder with a specific capacitance of as high as 720 F/g has been tested by the inventors herein. The resistivity of $RuO_2.xH_2O$ pellets was measured to be about $3\times10^{-3}$ $\Omega$-cm. The pellet, which was tested, was made by pressing the powder at 8000 lb/cm$^2$. This value is believed to be dominated by the contact resistance of powders. The bulk resistivity of $RuO_2.xH_2O$, however, can be much lower than this value. The specific surface area of $RuO_2.xH_2O$ powders was measured to be less than 70 m$^2$/g, which indicates that the porosity of $RuO_2.xH_2O$ was not high. Because of the low porosity of $RuO_2.xH_2O$, the amount of the electrolyte absorbed by $RuO_2.xH_2O$ was also low. For example, it is found that about 0.39 gm of 5.3 mol $H_2SO_4$ electrolyte can be absorbed by 1.0 gm of $RuO_2.xH_2O$. The number of ions contained in the electrolyte which were absorbed by $RuO_2.xH_2O$ powders was only about 50% of that required for the faradaic reaction with the $RuO_2.xH_2O$ electrode. In order to make the capacitor capable of charging or discharging at high rates, more electrolyte needs to be introduced into the electrode as described in the requirement (1). On the another hand, carbon blacks are very porous and can absorb much more electrolyte. For example, 1 gm of carbon black can absorb about 3.8 gm and 1.8 gm of 5.3 mol $H_2SO_4$ electrolyte for Black Pearls-2000 and Vulcan XC-72, respectively.

The electrodes for high rate electrochemical capacitors according to a preferred embodiment of the present are made by the following method:

High specific capacitance electrode material (e.g. $RuO_2.xH_2O$) was mixed with highly electronically conductive and highly porous material (e.g. carbon black or carbon fiber). The uniformly mixed $RuO_2.xH_2O$ powder and the carbon black were placed into a vacuum container. After the container was pumped to vacuum, the electrolyte (5.3 mol $H_2SO_4$) was filled into the container to wet the electrode materials. The excess electrolyte was then filtered out and the composite electrode material was formed. When the capacitor was assembled, pressure (e.g. about 1000 lb/cm$^2$) was applied on the electrode to make sure that the powders were compacted tightly together so that the resistance of the capacitor was low as described in the requirement (2).

To compare the specific capacitances for composite electrodes and $RuO_2.xH_2O$ electrodes, the specific capacitances of each were measured by cyclic voltammetry at different voltage scan rates as shown in FIG. 1. It can be seen that for $RuO_2.xH_2O$ electrodes, the specific capacitance reduced quickly with an increase of the voltage scan rate. The reason for the cause of the reduction of the specific capacitance has been discussed in the preferred embodiment, e.g. there were insufficient ions in the electrolyte near by the electrode material. In other words, at a higher voltage scan rate, not enough ions in the electrolyte are available for reaction with the solid electrode within a short time period. For composite electrodes, the specific capacitance at low rates is lower, because the capacitance contributed by carbon black is lower than that by $RuO_2.xH_2O$. However, the specific capacitance has been improved for the high voltage scan rate. For example, for a composite electrode made with 34% by weight of carbon black Vulcan XC-72 and 66% by weight of $RuO_2.xH_2O$, the specific capacitance is higher than that of electrode made with $RuO_2.xH_2O$ only at the voltage scan rates higher than 50 mV/sec. The interesting point is that the value of weight ratio between carbon black and $RuO_2.xH_2O$ for the composite electrode is close to that calculated theoretically for the minimum amount of the electrolyte needed from the electrode.

Figure 2:
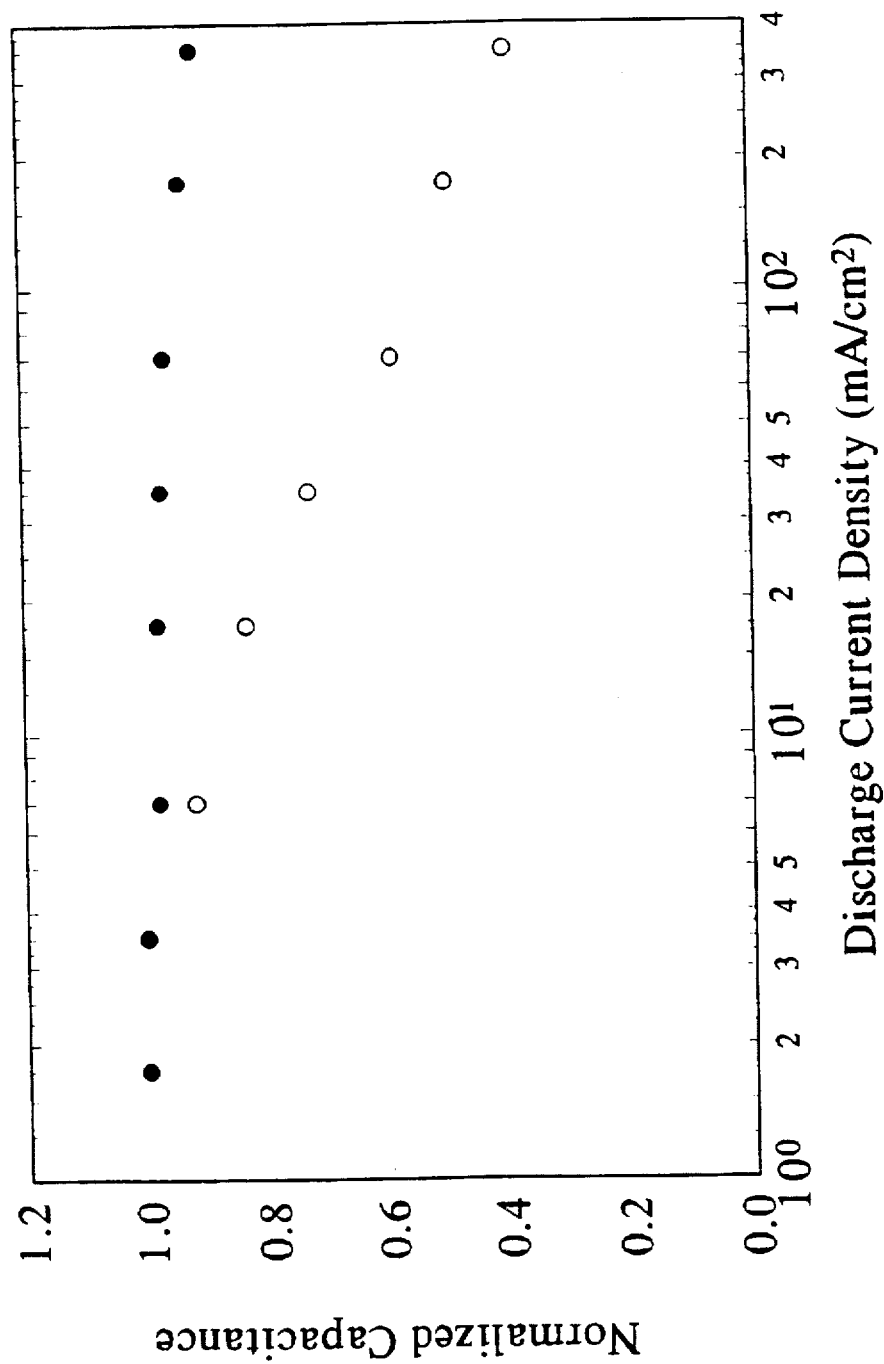
FIG. 2 is a graph of the relative capacitance as a function of current density for electrochemical capacitors made with composite electrodes (•) and for electrodes containing only $RuO_2.xH_2O$ (○). The diameter of the electrode was ¾ inches and the carbon black used was Black Pearls-2000 and the $RuO_2.xH_2O$ powder used was made by a sol-gel process.

Two electrochemical capacitors were made with different electrode materials. One capacitor was made with the electrode comprised of $RuO_2.xH_2O$ powders only. The capacitance at low current density (1.75 mA/cm$^2$) was about 9.36 F. The maximum working voltage of the capacitor was about 3.0 V. The weight of $RuO_2.XH_2O$ powders loaded in the capacitor was about 0.45 gm. The second capacitor was made with the electrode comprised of 20% weight by carbon black pearls-2000 and 80% weight by $RuO_2.xH_2O$ powders. The choice of the mass ratio between the $RuO_2.xH_2O$ powder and the carbon black was based on the theoretical calculation for the minimum amount of the electrolyte needed during the reaction with the electrode. The capacitance at low current density was about 1.36 F; the maximum working voltage of the capacitor was about 5.0 V; and the total weight of the electrode material (carbon and $RuO_2.xH_2O$) was about 0.25 gm. The capacitor performance for these two capacitors at different current density has been investigated by a dc charge and discharge method. Results are shown in FIG. 2. It can be seen that for the capacitor made with electrodes comprised $RuO_2.xH_2O$ powders only, the capacitance reduces more than 60% at a current density of 350 mA/cm$^2$. For the capacitor made with composite electrodes, the capacitance reduces only by less than 10% at the same current density. From FIG. 2, it can be seen that the power density with over 90% efficiency of deliverable energy is about 10 kW/kg and 70 W/kg for the capacitor comprised of composite electrodes and $RuO_2.xH_2O$ electrodes, respectively. The energy density at the current density of 350 mA/cm$^2$ is also calculated to be about 17 Wh/kg and 10 Wh/kg, respectively. These results clearly show that the performance of the capacitor comprised of composite electrodes is significantly enhanced.

The purpose of adding porous powder (e.g. carbon black) into the electrode according to the present invention is significantly different than that described in prior art. For example, Tatarchuk et al and Kurabayashi et al have added metal fibers and honeycomb current collector into the electrode in order to reduce the resistance of the electrode, because the materials used in these electrodes, either metal fiber or current collector, are more electrically conductive than the active materials used. In this invention, however, $RuO_2.xH_2O$ is the active material, which is more electrically conductive than carbon blacks, that is, the resistivity of $RuO_2.xH_2O$ is about 2 orders of magnitude less than that of carbon blacks. Therefore, the resistivity of the $RuO_2.xH_2O$ should be lower than that of the composite electrode.

Malaspina describes an electrode which is formed by coating metal oxides onto a high surface area carbon particles. In Malaspina, the carbon particles are used to facilitate fabrication of the electrodes for electrochemical cells. In contrast, the high surface area material of the present invention is used to provide a conductive means to incorporate an electrolyte in the electrode.

From FIG. 1, it can be seen that the specific capacitance for composite electrodes has not increased at low rates. However, the specific capacitance remains high at high rates due to the additional electrolyte in the electrode.

Further, for many other batteries, the carbon powder has been used to mix with active materials in order to improve the high rate performance. Because many active materials for battery applications are semiconductors, adding carbon will reduce the resistance of the electrode. This is not the purpose of carbon in this invention. Further, the addition of the high porous carbon in battery electrodes will increase the porosity of the electrode, which results in ions easily traversing the electrodes. Therefore, in these other applications only relatively small amounts of carbon can be used. However, in this invention, the amount of carbon in the electrode should be enough to absorb an adequate amount of electrolyte for the chemical reaction between the active electrode material and the electrolyte.

The major difference between battery and electrochemical capacitor is the reaction speed needed by the electrode. For a battery, the charge/discharge cycle is usually in the order of several minutes to several hours. Within that time period, the ion will be able to move from one electrode to another (anode to cathode) or from a separator to the electrode so long as the electrode is porous enough to allow the passing of ions. But for an electrochemical capacitor, the charge/discharge needs to be completed within milliseconds to seconds. The ion travel from the outside of the electrode will be not fast enough. The ion must be near the surface of the active material. This is why the active material must mix with porous material which absorbs adequate amount of electrolyte and introduces the ion into the electrode. The novel aspect of the composite electrode in this invention is to mix the active material with adequate amount of electrolyte. The high porous material (e.g. carbon black) plays a role of holding the electrolyte.

Although the present invention has been described with regard to a procedure to manufacture composite electrodes comprised of $RuO_2.xH_2O$ powders and carbon black, those skilled in the art will readily recognize that other manufacturing variations are available. Accordingly, inventors do not wish to be limited by the present specification, but only by the appended claims.

What is claimed is:

1. Method of making a composite electrode structure comprising the steps of:

saturating carbon black with an electrolyte;

mixing hydrous ruthenium oxide powder and the saturated carbon black; and forming the mixture of hydrous ruthenium oxide powder and the saturated carbon black to derive a desired electrode configuration.

2. The method of claim 1 wherein the electrolyte is sulphuric acid.

3. The method of claim 1 and further comprising the step of placing the mixture of hydrous ruthenium oxide powder and the saturated carbon black in a vacuum prior to the forming step.

4. The method of claim 1 and further comprising the step of applying pressure uniformly about the electrode configuration.

5. Method of making a composite electrode structure comprising the steps of:

saturating carbon black with sulphuric acid;

mixing hydrous ruthenium oxide powder and the saturated carbon black;

placing the mixture of hydrous ruthenium oxide powder and the saturated carbon black in a vacuum;

forming the mixture of hydrous ruthenium oxide powder and the saturated carbon black to derive a desired electrode configuration; and applying pressure uniformly about the electrode configuration.

* * * * *